United States Patent [19]

Garver et al.

[11] 4,242,070

[45] Dec. 30, 1980

[54] SHAPE OF CUT FOR SEMICURE BUTYL RUBBER BAG

[75] Inventors: Richard F. Garver; Srbo M. Stevanovich, both of Akron, Ohio

[73] Assignee: The B. F. Goodrich Company, Akron, Ohio

[21] Appl. No.: 125,422

[22] Filed: Feb. 28, 1980

[51] Int. Cl.³ .................... B29C 1/00; B29D 29/00
[52] U.S. Cl. .................... 425/28 B; 425/34 B; 425/43; 425/49; 249/65
[58] Field of Search ............ 425/28 B, 34 B, 35, 425/40, 43, 49, 50, 51, 52, 53, 54, 55, 56, 57, 58; 249/65

[56] References Cited

U.S. PATENT DOCUMENTS

| 1,250,504 | 12/1917 | Ray | 425/55 |
| 2,573,643 | 10/1951 | Hurry | 425/34 B |
| 2,599,046 | 6/1952 | Brucker | 425/34 B |
| 2,600,775 | 6/1952 | Hurry et al. | 425/43 X |
| 2,883,701 | 4/1959 | Sauer | 425/43 X |
| 3,610,563 | 10/1971 | Allen | 249/65 |

Primary Examiner—J. Howard Flint, Jr.
Attorney, Agent, or Firm—Joseph Januszkiewicz

[57] ABSTRACT

A cylindrical expandable sleeve for use in a curing process wherein a pair of annular end portions and a cylindrical expandable body have a longitudinally extending splice with interlocking ribs and surfaces to firmly interconnect such body into a unitary whole for use in successive expansions and contractions.

6 Claims, 3 Drawing Figures

SHAPE OF CUT FOR SEMICURE BUTYL RUBBER BAG

BACKGROUND OF THE INVENTION

This invention relates to a new and improved sleeve or bladder for the use in curing of belts and power transmission belting which may be of the V-type.

Power transmission belts are generally provided with an endless tension core which is generally formed from fabric cord and may at times be formed from stranded metal cables. In the manufacture of such power transmission belts it is essential to maintain a tensional strain on the belt during the curing process to minimize stretch when the belt is in use. The apparatus used to effect the cure of such belts must maintain sufficient radial pressure to effect the proper tensioning during the cure. To cure the V-belts or power transmission belting, the individual endless V-belts are stacked along with spacers into a cylinderical tank or housing which will have an expandable cylindrical bladder or sleeve located radially inwardly thereof such that upon heating of the V-belts and upon pressurization of the bladder, sufficient pressure is exerted radially outwardly to subject the V-belt to an even outward tension during cure. Steam pressure is used to cure the belts and a differential in pressure developes between the outer and inner surfaces of the bladder or sleeve such that leaks develop at the splice of the cylindrical bladder or sleeve which will ruin the production run because there is insufficient pressure exerted radially outwardly by the bladder to effect the proper tensioning of the belt for proper cure and shaping.

The present invention is directed to the improved splice in the expandable cylindrical bladder or sleeve to increase the strength of the splice and thereby increase the life of the curing bladder and reduce the corresponding scrap.

SUMMARY OF THE INVENTION

This invention comprises an expandable flexible bladder or sleeve which has a pair of spaced annular end portions and a cylindrical expandable body therebetween. The cylindrical body has a splice that extends the full length of the body. The splice has interlocking ribs to reinforce the interconnection of the respective ends of the cylindrical body. The invention provides a simplified design to overcome tension in the sleeve or bag and reduces the cutting power consumption by one-half to produce such a splice. The invention reduces the flat spotting of the splice on the sleeve to enhance its operation while increasing the splicing area.

DETAILED DESCRIPTION

Figure 1:
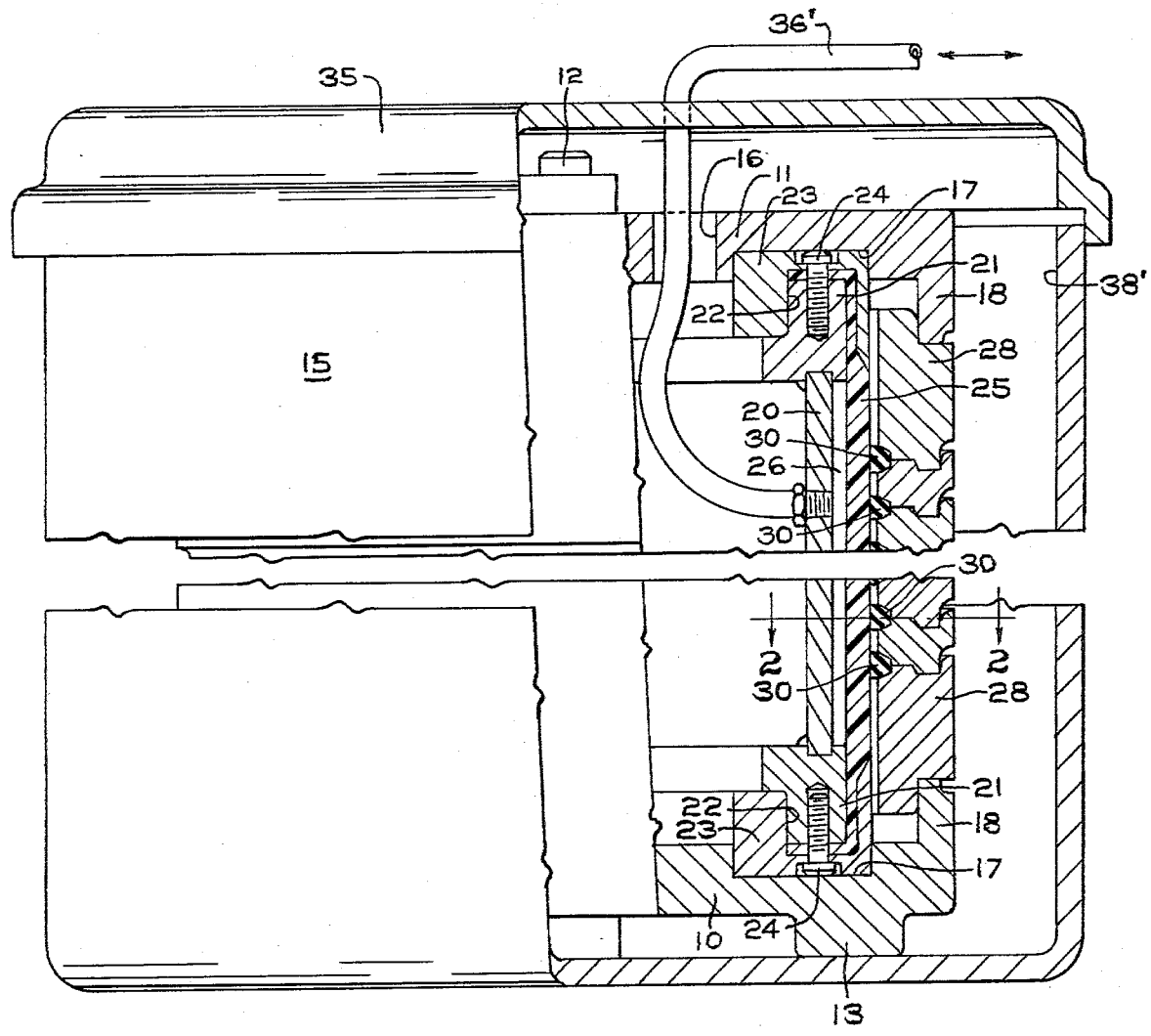
FIG. 1 is a fragmentary front elevational view of a curing mold with a portion broken away illustrating a portion thereof in cross-section.
Figure 2:
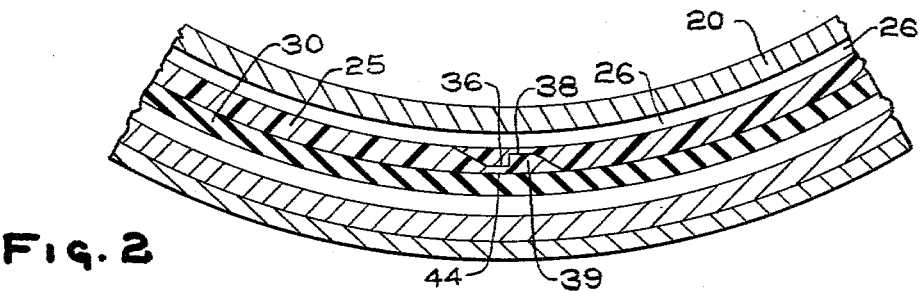
FIG. 2 is a plan cross-sectional view of a bladder and its adjacent curing mold parts taken on line 2—2 of FIG. 1.
Figure 3:
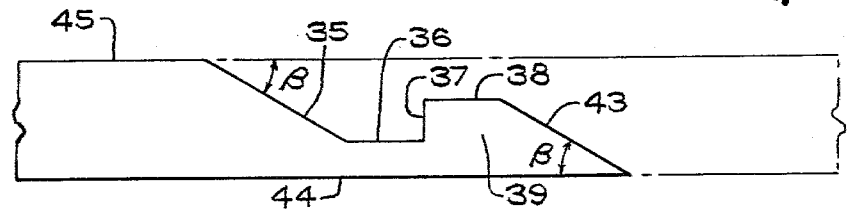
FIG. 3 is an enlarged fragmentary cross-sectional view of the splice of the bladder shown in FIGS. 1 and 2.

Referring now to the drawings, wherein like reference numerals designate like or corresponding parts throughout the several views, there is shown in FIG. 1 a pair of end metal closure plates 10 and 11 to resist the strains of the pressures involved in curing. Each end plate 10 and 11 has a central bore to receive a suitable connecting means such as a bolt 12 to retain the plates in their assembled condition. The lower end closure plate 10 has a plurality of circumferentially spaced downwardly extending lugs 13 that provide a clearance space between the plate 10 and the bottom portion of the encompassing cylindrical vulcanizing tank or vessel 15. Closure plate 11 is provided with an opening 16 to facilitate the passage of steam or water pressure lines to be described to equalize the pressure in the vulcanizing vessel. Each closure plate 10 and 11 has an annular groove 17 with a flanged portion 18. Suitably positioned between the closure plates 10 and 11 is a metal cylinder 20 having annular end members 21 securing the respective ends thereof as by welding. Annular members 21 are seated in annular grooves 22 in rings 23, which rings 23 are received by the grooves 17 of the closure plates. Rings 23 are secured to the annular members 21 by a plurality of circumferentially spaced bolts 24. An expandable cylindrical bladder 25 encompasses the metal cylinder 20 and the respective rings. The upper and lower peripheral edges of such bladder 25 is securely held between annular members 21 and the rings 23. The inner diameter of bladder 25 is slightly larger than the outside diameter of cylinder 20 to provide an annular clearance space 26 therebetween.

Between the respective flanged portions 18 of the closure plates 10 and 11 are stacked a plurality of rings 28 and 29. Rings 28 are closest to the respective plates 18 while rings 29 are stacked between such rings 28 in an interlocking manner. The inner peripheral surfaces of the mating portions of such rings are beveled to form a groove of a size and shape of a belt to be cured which as shown in FIG. 1 are designated 30. The belts are manufactured in the usual manner then positioned against one of the beveled or inclined edges of ring 29. Another ring 29 is then positioned on the upper edge of the positioned ring such that the V-shaped belt is captively secured by the inclined or beveled edges of the rings 29. Another belt is then positioned upon the uppermost ring 29 and the process continued until all of the grooves are filled. The exact manner of loading or positioning these belts in these grooves is well known to those skilled in the art and a detailed explanation thereof is not seen necessary. As shown in the lowermost belt 30 in FIG. 1, the inner surface of the belts 30 are abuttingly engaged by the outer surface of the bladder 25 such that fluid under pressure, either air, steam, or water, supplied to the clearance space 26 from a source to be described exerts a pressure on the bladder 25 which in turn transfers the pressure to the V-belt being cured and the V-belts are forced outwardly against the beveled or inclined walls of the mold or rings 29.

The entire described apparatus of the closure plates 10 and 11, the rings 28 and 29, are enclosed and seated in the vulcanizing tank or vessel 15, which vessel has a lid 35 positioned thereon to form a closed chamber. A conduit 36' entering lid 35 through a suitable opening, extends through opening 16 of closure plate 11 and is threaded into the wall of cylinder 20 to provide a means for introducing steam or fluid under pressure to the clearance space 26 and thereby exert a pressure against the interior wall of expandable bladder 25 which will force the belts outwardly against the inclined walls of the mold. Since the cylindrical bladder 22 is made of elastomeric material, its radial expansion outwardly by the steam pressure will exert equal radial forces along all points. While so subjected to the steam pressure, additional vulcanizing fluid is suitably introduced into vulcanizing tank or vessel 15 between the interior wall 38' and rings 29. The steam surrounds the outside of the mold forms, the V-belts and also fills the interior of the vessel 15 because the closure plates are provided with openings 16 which facilitate the distribution of the pressurized steam. The pressure supplied to the clearance space 26 adjacent to bladder 25 is much greater than the pressure of the steam employed in the curing since the difference between these pressures (that of the expanding fluids and that of the steam used for heating) is the effective pressure.

The bladder 25 is constructed from a rectangular piece of rubberized materials whose respective ends are machined to provide interlocking ribs prior to its vulcanization. The inner periphery of one end of the bladder 25 or the rubberized material at the splice has an inclined surface 35 that merges into a planar surface 36 substantially parallel to the inner peripheral surface of the bladder, followed by a wall 37 at 90° angles to surface 38 to form a projection 39 having an inclined surface 43 that merges with the inner peripheral surface 44 of the bladder. The surface area 36 is equal to the surface area 38 while surface area 43 is equal to surface area 35. Surfaces 44 and 36 are parallel to the outer peripheral surface 45 of the bladder. The flat surface 38 in cooperation with wall 37 and surface 36 makes a shoulder for the raised abutment or projection 39.

The other end of bladder 25 has similar inclined surfaces and abutments or recesses that are complementary to each other and since surfaces 36 and 38 are equal and surfaces 43 and 35 are equal such abutment and recesses mate in an interlocking manner followed by a vulcanization thereof to provide a bladder that resists substantial pressures to separate. The splice surfaces may have an adhesive coating applied thereto prior to the complementary engagement of such surfaces and the subsequent vulcanization. The respective angle β between the outer surface 45 and the inner surface 44 with their respective inclined surfaces is approximately 30° to provide more splicing area. Such angle β is also the angle subtended by the inclined surface 35 with the circumferential centerline between the inner peripheral surface 44 and the outer peripheral surface 45. With the use of the present splice, the life of the curing bladder has been extended for a considerable time and the power consumption to make such a splice is reduced by one-half.

Having thus described the invention, what is claimed is:

1. A cylindrical expandable vulcanized sleeve for use as a bladder in a curing process having a pair of annular end portions and a circumferentially extending cylindrical expandable body between said end portions, said expandable body having an outer surface and an inner surface with a medium circumferentially extending centerline therebetween, a longitudinally extending splice extending lengthwise from one end portion to the other end portion of said cylindrical body, said splice having a pair of spaced inclined surfaces interconnected by a recessed shoulder.

2. A cylindrical expandable sleeve as set forth in claim 1 wherein said inclined surfaces are equal in surface area, said inclined surfaces are at the same angle to the centerline of said expandable sleeve, and one of said inclined terminates into a recess adjacent to said shoulder.

3. A cylindrical expandable sleeve as set forth in claim 2 wherein said recessed shoulder provides an interlocking portion with said recess on an adjacent edge.

4. A cylindrical expandable sleeve as set forth in claim 2 wherein one of said inclined surfaces make a 30° angle with the extension of said outer surface and the other one of said inclined surfaces makes a 30° angle with the inner peripheral surface of said bladder.

5. A cylindrical expandable vulcanized sleeve for use in a vulcanizing press, said sleeve having a pair of spaced annular edges and a cylindrical expandable body therebetween, a splice in said body that extends from one of said annular edges to the other of said edges, said cylindrical body having an inner peripheral surface and an outer peripheral surface, said splice extending completely through said cylindrical body, said splice having an inclined surface adjacent to said inner peripheral surface and an inclined surface adjacent to said outer peripheral surface, each of said inclined surfaces terminating into flat planar surfaces that are parallel to said inner and said outer peripheral adjacent surfaces, said flat planar surfaces being non-coplanar defining a shoulder therebetween and a recess with said inclined surface adjacent to said outer surface.

6. A cylindrical expandable vulcanized sleeve as set forth in claim 5 wherein said inclined surface adjacent to said inner peripheral surface makes a 30° angle relative thereto, said non-coplanar surfaces are equal in dimension, and said inclined surfaces being equal in dimension.

* * * * *